United States Patent [19]

Fitzpatrick

[11] Patent Number: 4,775,742

[45] Date of Patent: Oct. 4, 1988

[54] PRODUCTION OF VINYL HALIDE RESINS FOR CLEAR SOLUTIONS

[75] Inventor: Stephen T. Fitzpatrick, Gilbertsville, Pa.

[73] Assignee: Occidental Chemical Corporaton, Niagara Falls, N.Y.

[21] Appl. No.: 812,034

[22] Filed: Dec. 23, 1985

[51] Int. Cl.[4] ............................ C08F 6/24; C08F 2/20
[52] U.S. Cl. .................................... 528/486; 528/487; 528/490; 524/834; 526/199; 526/200; 526/344.2; 526/345
[58] Field of Search ...................... 528/486, 487, 490; 523/332; 524/834; 526/344.2, 199, 200, 345

[56] References Cited

U.S. PATENT DOCUMENTS

| | | | |
|---|---|---|---|
| 2,137,627 | 11/1938 | Reed | 528/486 |
| 2,482,048 | 9/1949 | Williams | 528/486 X |
| 4,133,947 | 1/1979 | Kalka et al. | 528/486 X |
| 4,184,029 | 1/1980 | Kalka et al. | 528/486 X |

FOREIGN PATENT DOCUMENTS 58-91716  5/1983  Japan ................................. 528/486

OTHER PUBLICATIONS

"Encyclopedia of PUC" L. I. Nass (ed.) Marcel Dekker, Inc. N.Y., N.Y. (1976) pp. 122, 124.

Translation of Ge. Offen. 2,206,903 to Bauer et al., laid-open 8/'73.

Primary Examiner—Joseph L. Schofer
Assistant Examiner—F. M. Teskin
Attorney, Agent, or Firm—James F. Tao; James F. Mudd

[57] ABSTRACT

A process is disclosed for producing vinyl halide homopolymers and copolymers that are suitable for use in clear solutions. The process comprises reacting vinyl halide and optional co-monomers in the presence of an aqueous medium containing a suspending agent, and treating the resulting resin particles with an acidic material. The resins resulting from the process of the invention have improved solution and film properties. When the resin is dissolved in a suitable solvent, the resulting solution has improved clarity, that is, a reduction of haze in the solution phase. When the solution is coated on a substrate and the solvent evaporated, either to provide a coated substrate or a cast film, the resulting films have improved clarity, that is, a reduction in haze in the film. The films and coatings have improved gloss as a result of reduction of seed particles in the film. Fibers produced from the resin solutions have improved integrity and strength. The solutions, films, coatings and fibers can be clear or colored as a result of the inclusion of dyes and pigments.

10 Claims, No Drawings

PRODUCTION OF VINYL HALIDE RESINS FOR CLEAR SOLUTIONS

BACKGROUND OF THE INVENTION AND INFORMATION DISCLOSURE STATEMENT

This invention relates to vinyl halide homopolymers and copolymers intended to be dissolved in solvents and used to produce fibers, to cast films and for coatings for various substrates.

Vinyl halide homopolymers and copolymers, especially polymers of vinyl chloride, are typically produced by suspension polymerization of the monomers in the presence of a suspending agent. It is found that when such polymers are dissolved in solvents and used as casting solutions or as coatings for substrates, undesirable "specs" or "seeds" are found in the coating and casting solutions. Moreover, the films resulting from casting or from coating the solutions on substrates are hazy in appearance and/or have a "grainy" appearance when the solvent evaporates. Fibers produced from such solutions tend to break at the points where specs or seeds occur. These adverse effects are believed to be caused by the fact that the suspending agent is insoluble in the common solvents. The insoluble particles produce the undesirable effects just described.

U.S. Pat. No. 4,355,146 describes a process for producing a vinyl chloride resin which comprises subjecting a vinyl chloride monomer and co-monomers to suspension polymerization in an aqueous medium using a water-soluble protein as a suspending agent, and treating the resulting polymer with a proteolytic enzyme. The resulting polyvinyl chloride (PVC) is referred to as "blending PVC" and is said to be compounded with a "paste PVC" to give a paste dispersion having excellent viscosity properties for which molded articles having superior tensile strength, abrasion resistance, weatherability, water resistance, etc., can be produced. The patentees state that the water-soluble protein used as the suspending agent and remaining on the surface of the polymer particles can be decomposed by very simple and low cost method which comprises treating the resulting polymer with a proteolytic enzyme, or protease. The patentees further disclose that proteins can be hydrolyzed with acids or alkalies, but this requires a long period of time or severe conditions with regard to temperature, concentration, etc. The patentees state that the use of such a hydrolyzing method in the decomposition of the remaining protein on the polymer surface reduces productivity or degrades the properties of the resulting product.

German Offenlegungsschrift No. 2,206,903 (Aug. 23, 1973) discloses preparation of polyvinyl chloride by aqueous phase suspension polymerization in the presence of cellulose ethers. Post treatment with cellulase in an aqueous suspension at a pH value of between 7 and 3 is disclosed. The treatment is disclosed to improve the absorption of plasticizers and the gelling of the PVC. The improved gelling is said to improve the break resistance at low temperatures of molded articles. Example 1 of the patent shows that when a thin film is milled from PVC that was treated with cellulase, the film has better low temperature strength than a film made of untreated PVC. The product contemplated in the patent is not a solution grade product, and hence not relevant to the present invention.

Japanese Patent Publication Sho No. 58-91716 (May 31, 1983), discloses preparing graft polymers of thermoplastic particles and vinyl monomers such as styrene in a suspension polymerization process. The polymer product was washed with acid; and the suspending agent was removed.

A data sheet pertaining to Methocel cellulose ether products discloses that Methocel cellulose ether products in strong acids or in strong caustic solutions will decrease in viscosity. Such loss in viscosity is indicative that hydrolysis is occurring. Nevertheless, from this disclosure, the results of the present invention cannot be foreseen.

The object of this invention is to treat vinyl halide resin particles in an effective and efficient manner with an acidic solution to remove and/or solubilize the suspending agent such that the resulting resins can be used to produce clear polymer solutions that are suitable for producing fibers, casting films and for the coating of substrates.

SUMMARY OF THE INVENTION

A process is provided for producing vinyl halide homopolymers and copolymers that are suitable for use in clear solutions. The process of the invention comprises reacting vinyl halide and optional co-monomers in the presence of an aqueous medium containing a suspending agent, and treating the resulting resin particles with an acidic material.

As a result of the acid treatment process of the invention, the suspending agent residue remaining on the polymer molecules is believed to be partially removed and partially disintegrated to have the effect of solubilizing at least part of the suspending agent. The acid material can be readily washed off the resin during the conventional filtration or centrifuge steps employed for dewatering the polymer. Alternatively, the acid material can be neutralized with a basic material prior to separation by filtration and centrifuging. The resulting salt that is produced is readily washed off the resin particles during the filtration or centrifuging process.

The resins resulting from the process of the invention have improved solution and film properties. Thus, when the resin is dissolved in a suitable solvent, the resulting solution has improved clarity, that is, a reduction of have in the solution phase. When the solution is cast to produce a film or coated on a substrate and the solvent evaporated, the resulting films have improved clarity, that is, a reduction in haze in the film. The films have improved gloss as a result of reduction of seed particles in the film. Fibers have greater integrity and strength as the result of few seed particles in the polymer solutions.

DESCRIPTION OF DETAILED EMBODIMENTS OF THE INVENTION

Preparation of the Vinyl Resins

Vinyl chloride is the preferred vinyl halide monomer of the invention. Vinyl chloride monomer that is greater than 95% pure is preferably utilized as the monomer. In many commercial processes, recycled vinyl chloride monomer is utilized, and the process of the invention accommodates this custom. Reaction kinetics must be optimized to account for the reactive impurities in recycle streams. Generally, if a recycle stream contains less than about 5 percent impurities it can be utilized as monomer without further treatment, depending upon the identity of the impurities.

Various co-monomers can be used with the vinyl chloride monomer, generally in a proportion of up to about 50 weight percent of the total monomer component. Suitable co-monomers include unsaturated esters, including vinyl acetate, vinyl propionate, vinyl butyrate and vinyl benzoate; alkyl methacrylates, such as methyl methacrylate; alkyl acrylates, such as 2-ethylhexyl acrylate. Other unsaturated esters include alkyl and aryl mono- and di- esters of maleic acid and fumaric acid, such as mono- or diethyl maleate. Many other suitable co-monomers are disclosed in U.S. Pat. No. 4,007,235, the disclosure of which is incorporated herein by reference.

The suspending agents used in the process of the invention include any of the commonly utilized cellulosic suspending agents such as modified cellulose polymers like hydroxypropylmethylcellulose of various molecular weights. Other cellulosic suspending agents include methyl cellulose, hydroxy ethyl cellulose, carboxy methyl cellulose, hydroxy propyl cellulose, and the like. Other common protective colloids used in suspension polymerization include gelatin, guar, and other materials known to those skilled in the art. Use of the invention is not precluded by any of these suspending agents.

The initiators used in the process are free radical initiators and can be any of the commonly utilized peroxy compounds. Suitable peroxy compounds include diacylperoxides like dilauroylperoxide, didecanoylperoxide, dibenzoylperoxide and others (although not necessarily symmetric); peroxyesters like cumylperneodecanoate, t-butylperneodecanoate, cumylperipivalate and others; peroxydicarbonates like isopropylperoxydicarbonate, sec-butylperoxydicarbonate, -ethylhexylperoxydicarbonate, dicetylperoxydicarbonate and others (although not necessarily symmetric); azo compounds like azoisobutyronitrile and others (although not necessarily symmetric) or an essentially oil-soluble free radical initiator commonly utilized for vinyl polymerization. Initiator(s) and level(s) are generally selected to provide a uniform rate of reaction over the desired reaction time.

Additives can be used on a selective basis in the aqueous or oil phase. Additives include secondary suspending agents such as glycerol monolaurate, sorbitan monolaurate, sorbitan monostearate, low hydrolysis (20-40%) poly (vinyl acetate) and others; antioxidants like butylatedhydroxytoluene, substituted phenols, thiodipropionate esters, phosphites and others; chain-transfer agents, capable of modifying polymer molecular weight, such as trichloroethylene, 1,2-dichloroethylene, t-dodecylmercaptan, mercaptoethanol and others.

Optional chelating agents that can be incorporated into the solution containing water-solubles are any of the common materials that give rise to ligands capable of binding multivalent metal ions. Examples are alkali metal or ammonium salts of ethylenediaminetetraacetic acid (EDTA) or nitrilotriacetic acid (NTA). Chelating agents are not absolutely necessary, but have been found to help maintain reactor cleanliness. Buffering systems can also be used to control pH in the aqueous phase.

Table 1 summarizes the proportions in which the reaction components are employed in the process of the invention.

TABLE 1

| Reaction Components | Broad Range | Preferred Range |
| --- | --- | --- |
| Vinyl Chloride phm | 50-100 | 50-95 |
| Comonomer phm | 0-50 | 5-50 |
| Water phm | 80-300 | 120-170 |
| Initiator phm | 0.002-0.2 | 0.002-0.2 |
| Primary Suspending Agent phm | 0.03-3 | 0.05-0.2 |
| Secondary Suspending Agent phm | 0-0.5 | 0-0.2 |
| Chelating Agent phm | 0-0.5 | 0-0.25 |

Polymerization Condition

The reaction components are mixed in a suitable vessel equipped for heating and agitation. The temperature is raised by suitable means to commenc the reaction which is generally conducted at a reaction temperature in the range of about 30° to about 80 ° C. The agitator speed is in the ranged of about 30 to about 400 rpm. depending on the reactor geometry. The reaction is generally conducted with about 25-50 weight percent solids in the reactor. The reaction time is generally about 2 to about 12 hours, preferably about 4 to 8 hours. During the course of the reaction, the vinyl polymer forms as resin particles in an aqueous slurry.

Treatment of Resin Particles

The process of the invention involves treatment of the vinyl resin particles with a dilute acid solution. Generally the aqueous slurry produced in the polymerization reactor is used for the treatment step. Alternatively, solidifed, powdered vinyl resin can be re-slurried and treated with the dilute acid solution.

Acids used for the treatment step include the strong acids such as hydrochloric acid, sulfuric acid, nitric acid, phosphoric acid, and the like. Other acids that can be employed include strong organic acids such as acetic, oxalic, chloroacetic acids, and the like. The acid concentration is generally in the range of about 0.5 to about 25 weight percent of the acidic component in an aqueous solution, preferably about 1.5 to about 10 weight percent of acidic component.

The treatment of the resin slurry with the acid solution can be connected in any suitable vessel such as a mixing tank. The treatment time is in the range of about 2 to about 50 hours. The treatment temperature is in the range of about 40° to about 100° C.

As a result of the treatment of the resin particles with the dilute acid solution, the suspending agent is removed and/or solubilized. Separation of any particles of suspending agent usually occurs in the conventional filtration or centrifuging step wherein the aqueous phase is removed from the resin particles. During the separation steps involving the use of the filter or centrifuge, the acid solution can be readily washed from the resin particles by flushing with clean water. Alternatively, the acid can be neutralized with a suitable basic material such as a dilute caustic solution prior to introducing the resin particle slurry to the filter or centrifuge. Salt resulting from the reaction of the acid with the caustic solution can be readily washed from the resin particles during the separation by filter or centrifuge.

In the event neutralization of the acid is desired, a caustic solution can be used such as a solution of sodium hydroxide or other alkali metal hydroxides. Alternatively, solutions of ammonia or other alkaline materials can be employed. The alkaline material is employed under well-known conditions to neutralize the acid.

Preparation of Solutions

The vinyl resins prepared in accordance with this invention are dissolved in suitable solvents to form solutions that can be used for coating substrates, for casting films and for spinning fibers. Suitable solvents included ketones, such as acetone an methyl ethyl ketone; aromatic hydrocarbons such as toluene and xylene; aliphatic hydrocarbons, such as mineral spirits; esters, such as ethyl acetate and butyl acetate; and etheric solvents, such as tetrahydrofuran, diethyl ether and polyethers, such as glyme ethers and diethylene glycol.

The vinyl resin and solvent are generally mixed in a proportion of about 5 to about 50 weight percent of resin in the solvent, preferably from about 10 to about 40 weight percent. Mixing can be carried out in a suitable vessel and the mixing temperature generally in the range of about 30° to about 60° C.

Solution Properties and Uses

The solutions of the invention can be applied to any suitable substrate to provide a vinyl film coating on such substrates. Suitable substrates include: metals such as steel, brass or bronze, aluminum, and the like; wood, and other cellulosic materials; glass and other plastics.

The solutions of the invention can also be used for casting of self-supporting films. Such films are generally cast by well-known means on a metal surface and pulled off the metal surface after evaporation of the solvent.

The solutions of the invention are further useful in the spinning of fibers by conventional methods. The seeds and specs resulting from insoluble suspending agents cause points of weakness in the spun fibers. The fibers of the invention have greater integrity and strength as a result of the reduction in seeds or specs in the solutions of the invention.

In any of the above-described uses, pigments and dyes can be incorporated in the solutions of the invention to provide colored end products.

Significant improvements in solution and film haze and clarity result from using vinyl resins prepared in accordance with this invention. With respect to the solution coatings, there is a reduction in haze and improved clarity when the resins of the invention are used in contrast to prior art resins. With respect to the coated films and cast films that result from evaporation of the solvent, the films also have improved clarity as a result of reduction of haze in the films. Furthermore, the films produced from the vinyl resins of the invention have improved gloss as a result of the reduction in seeds or specs in the resin film of the invention.

It is customary for solutions of vinyl resins to be filtered to remove seeds and specs, such as those caused by residual particles of suspending agent. The more seeds and specs, the greater effort must be spent in such filtration. As will be shown in the illustrative examples, the filterability of the solutions of the invention is greatly enhanced by use of the vinyl resins of the invention.

THE EXAMPLES

The foregoing results are illustrated in the following examples which are intended to illustrate the invention but not to limit it. In this specificationa and claims, all temperatures are given in degrees Celsius and parts and percentages are by weight unless indicated otherwise.

EXAMPLE 1

A sample of 15% by weight vinyl acetate, 85% vinyl chloride resin (made using methyl hydroxypropyl cellulose suspending agent) was slurried in deionized water and split into two portions. Enough 32% hydrochloric acid was added to one portion to get ~1.5% active HCl (by weight) in the water. Both samples were held at 53° C. for 72 hours, filtered and washed with 2 volumes of deionized water, and dried. Both dried samples were dissolved in a 50:50 mixture of methyl ethyl ketone and toluene (20 parts resin plus 80 parts solvent), and compared in visual appearance, solution filtration, and dried film quality. The treated sample was found to be substantially free of insoluble material as was evidenced by solution clarity, rapid filtration rate, and glossy dried film. The untreated sample was found to have a cloudy solution appearance, slow filtration rate, and a grainy dried film.

EXAMPLE 2

Tests were made with dry particles of a resin made of 84 weight percent vinyl chloride and 16 weight percent vinyl acetate by suspension polymerization in the presence of hydroxypropyl methyl cellulose suspending agent. The resin particles were re-slurried with deionized water at 33% solids, placed in glass bottles to which was added HCl in concentrations of 0.0%, 1.0%, 1.25%, 1.5%, 1.75%, and 2.0% in water. The bottles were then placed in a water bath at 52° C. (125° F.) for 72 hours. The slurry was then dewatered on a filter, washed twice with two volumes of deionized water, placed in a glass tray, and dried in an oven. Then 20 parts by weight of each resin was dissolved in 24 parts by weight of methyl ethyl ketone and 56 parts by weight of toluene. The solutions were coated on cold rolled steel. The solvents were allowed to evaporate. The properties of the solutions and resulting films were observed. Solution and film haze and clarity for the resin treated with 2% HCl were compared to an untreated control of the same resin; the same resin when commercially prepared (no acid treatment), and a competitive material. The results are shown in Table 2. The acid treated resin (A) shows substantial improvement over the untreated resin (B). The commercial process tends to remove undesirable particles which accounts for the improvement in resin (C) compared to the untreated resin (B). The treated resin (A) meets the standards of the best available competitive material (D).

TABLE 2

|  | SOLUTION PROPERTIES | | | FILM PROPERTIES | |
|---|---|---|---|---|---|
|  | | Insolubles | | | |
|  | Clarity/Haze | Hegman Gauge | Inverted Jar[2] | Clarity/Haze[3] | 60° Gloss |
| (A) Solution of resin treated with 2% HCl | Excellent | Scattered[1] | Few | No. 9 (Excellent) | 88 |
| (B) Solution of resin not treated with HCl | Good | 2.5 mil | Moderate | No. 5 (Fair) | 80 |

TABLE 2-continued

| | SOLUTION PROPERTIES | | | FILM PROPERTIES | |
|---|---|---|---|---|---|
| | | Insolubles | | | |
| | Clarity/Haze | Hegman Gauge | Inverted Jar[2] | Clarity/Haze[3] | 60° Gloss |
| (C) Resin of Example 2 produced commercially | Excellent | 1.8 mil | Moderate | No. 5 (Fair) | 83 |
| (D) Competitive resin similar to resin of Example 2 | Excellent | Scattered[1] | Few | No. 9 (Excellent) | 84 |

[1] Insolubles few and scattered making it impossible to get a definite reading. This implies a low level of insolubles.
[2] The solution is allowed to stand undisturbed for 2-4 hours. The jar is then inverted and allowed to stand undisturbed for 1-2 hours. Level of insolubles (seeds) are noted and rated where they cling to side of jar in the space above the liquid level. Rating is "none", "few", "moderate", "heavy" and "very heavy".
[3] Rating is 10 → 0 where 10 is perfect (no insolubles, no haze) and 0 is very poor (many insolubles, very hazy or opaque).

A solution of the resin of Example 2 that had been treated with 2 percent HCl was subjected to a filtration test and compared with a resin solution that had not been treated with HCl, as well as with a commercial control of the same resin produced in a commercial process and with a competitive resin solution. The data resulting from the test is shown in Table 3.

TABLE 3

| | Time For Passage of Given Weight of Solution Through Filter*, Seconds | | | |
|---|---|---|---|---|
| Solution Passed Through Filter, Ounces | 12 | 16 | 20 | 24 |
| Solution of Resin Treated with 2% HCl | 18 | 24 | 35 | 49 |
| Solution of Resin Not Treated with HCl | 54 | 93 | 167 | 300 |
| Resin of Example 2 Produced Commercially | 50 | 83 | 142 | 260 |
| Competitive Resin Similar to Resin of Example 2 | 35 | 53 | 78 | 116 |

*Filter Paper was Viscus 3005 (S-350-CM)

The hydrochloric acid treated resin solutions were formulated with various pigments and used to coat cold rolled steel panels. The solvents were evaporated to provide substrates coated with the resins of Example 2. When the coated substrates were subjected to tests for blisters (ASTM-D714) and for rust (ASTM-D610), they were found to be comparable with substrates coated with commercial coatings of the same base resin and with a comparable competitive commercial resin as far as blister and rust development.

What is claimed is:

1. In a process for producing vinyl halide homopolymer or copolymer resin particles in suspension in an aqueous medium in the presence of a suspending agent selected from a cellulosic suspending agent, gelatin and guar, the improvement comprising treatment of the resulting vinyl halide homopolymer or copolymer resin particles with a strongly acidic solution at a pH of less than about 1.

2. The process of claim 1 wherein the vinyl halide is vinyl chloride.

3. The process of claim 2 wherein the acid treated resin particles are filtered or centrifuged to separate the resin particles from the aqueous medium.

4. The process of claim 3 wherein the acid treated resin particles are treated with an alkaline solution to neutralize the acid, and thereafter filtered or centrifuged to separate the resin particles from the aqueous medium.

5. The process of claim 2 wherein the suspending agent is a cellulosic suspending agent.

6. A process for producing vinyl halide homopolymer or copolymer resin particles suitable for use in a clear solution, which comprises reacting vinyl halide and optional co-monomers in the presence of an aqueous medium and a cellulosic suspending agent, and treating the resulting resin particles with a strongly acidic material at a pH of less than about 1.

7. The process of claim 6 wherein the vinyl halide is vinyl chloride.

8. The process of claim 7 wherein the acid treated resin particles are filtered or centrifuged to separate the resin particles from the aqueous medium.

9. The process of claim 8 wherein the acid treated resin particles are treated with an alkaline solution to neutralize the acid, and thereafter filtered or centrifuged to separate the resin particles from the aqueous medium.

10. A process for producing vinyl chloride copolymer resin particles suitable for use in a clear solution, which comprises reacting vinyl chloride and a comonomer in the presence of water and a cellulosic suspending agent, and treating the resulting resin particles with a strong acid in the range of about 0.5 to about 25 weight percent of the acidic component in an aqueous solution.

* * * * *